United States Patent Office.

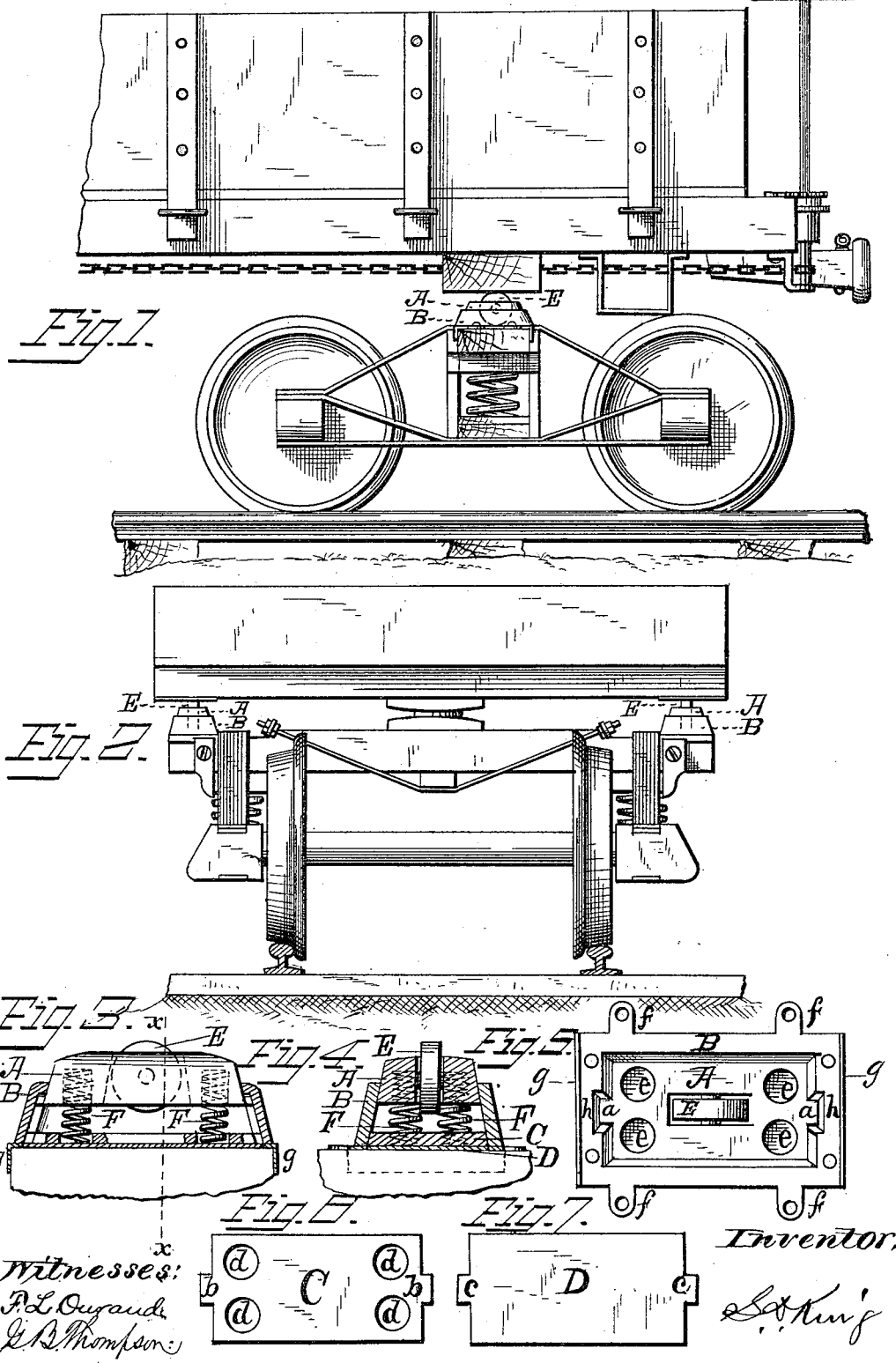

SIDNEY D. KING, OF PITTSTON, PENNSYLVANIA, ASSIGNOR OF FIVE-EIGHTHS TO GEORGE B. THOMPSON, OF SAME PLACE, AND CLARENCE D. SIMPSON, OF SCRANTON, PENNSYLVANIA.

SIDE BEARING FOR RAILWAY-CARS.

SPECIFICATION forming part of Letters Patent No. 273,693, dated March 6, 1883.

Application filed August 7, 1882. (No model.)

*To all whom it may concern:*

Be it known that I, SIDNEY D. KING, a citizen of the United States, residing at Pittston, in the county of Luzerne and State of Pennsylvania, have invented a new and useful Improvement in Yielding Side Bearings for Cars, of which the following is a specification.

My invention relates to cars having swiveling trucks, to which it is applied, as and for the purposes described in Letters Patent granted to me November 8, 1881.

My present invention consists in the peculiar construction, combination, and relative arrangement of the several parts that form the said side bearing, the object being, first, to have the springs properly supported, carried, and protected to sustain the vertical, horizontal, and oblique pressure to which they are subjected; second, to prevent the parts of the spring-case from binding under such pressure; and, third, to provide more convenient and effective means for connecting and securing the parts together and limiting their motion.

In the drawings I have shown a wheel introduced in the upper part of the spring-case; but while this may be used in some cases with advantage, I find, as a rule, that sufficient relief is afforded against friction by the springs within the spring-case, which together form said yielding bearing, and that this wheel may be dispensed with, in which case the slot to receive the wheel in the upper part of the spring-case is omitted, and in place thereof a suitable face is provided to bear against the upper rub-iron attached to the car-body.

In the accompanying drawings, in which similar letters of reference indicate like parts, Figure 1 is a side view of one end of a car, showing a mode of applying my side bearing between a car-truck and a car-body. Fig. 2 is an end view of a car, showing end views of the side bearings in place. Fig. 3 is a longitudinal view of my yielding side bearing partly in section, showing the position and arrangement of the several parts when not under pressure. Fig. 4 is a transverse view of the same, also partly in section. Fig. 5 is a bottom view, showing the inside of the outer parts, A and B. Fig. 6 is a view of the part C, which supports the bottom of the springs to prevent their displacement; and Fig. 7 is a view of the bottom plate, D, upon which the springs rest. In place of these two plates C and D projections or depressions may be formed upon the plate D, in place of the holes $d$, to prevent the displacement of the springs, and the plate C may then be dispensed with.

I make the parts A, B, and E preferably of cast-iron. The lower or outer part, B, of the spring case or bearing is formed with flanges $g$ and with lugs $f$, having holes through which to insert bolts to secure the bearing in place, and the parts are so formed that the said bolts are the only means required, not only to attach the side bearing to the car, but also to hold the parts of it together. This part B is beveled on its inner sides to afford a suitable opening to receive the other parts through the bottom, and to afford play and prevent the parts A and B from sticking or binding under the oblique pressure that they must sustain. The grooves $h$, running nearly to the top of the part B shown in Fig. 5, form guides and stops to receive the projections on the ends of the part A. The upper or inner part, A, of the spring case or bearing is beveled on its outer sides or side faces to correspond with the inner sides or faces of the part B, for the purposes previously stated. It is formed preferably with end projections, $a$ $a$, which are adapted to slide up and down in said grooves $h$. It is also formed with pockets $e$ to receive and form a suitable bearing for the upper part of the springs F. The friction-wheel E may be journaled in the part A, projecting through a suitable slot, so as to form a bearing for the upper rub-iron; or, as previously stated, this wheel and slot, may be dispensed with and any other suitable face may be substituted.

The aggregate power of the springs in each complete side bearing should be very much less than that of the carrying-springs ordinarily used thereunder, or, say, from one-fifth to one-fifteenth the strength required for carrying-springs. The strength required depends upon the distance that the bearings are placed from the centers of the trucks, and also upon the kind of car and the service for which it is designed and used. They should be so proportioned as to have sufficient power to keep the car-body at all times in a comparatively upright position, and yet permit the trucks to oscillate and conform to uneven tracks, thus keeping the car-body and its load supported alone upon the centers of its trucks, excepting only the comparatively small force required to overcome the resistance of the springs in these yielding bearings.

What I claim as my present invention is—

1. A yielding side bearing for railway-cars, consisting of one or more springs inclosed in a case, which is formed and constructed, as set forth, so that when the bearing is depressed the play between the upper and lower parts of the case is increased, substantially as described.

2. A yielding side bearing for cars, having the upper portion of the spring-case beveled on its sides, making it widest at the base, and having the lower portion of said case beveled from top to bottom on its inner side faces to correspond with and receive the upper part through the bottom of said lower part, substantially as described.

SIDNEY D. KING.

Witnesses:
G. B. THOMPSON,
H. C. DEWEY.